United States Patent
Bildstein et al.

(10) Patent No.: US 9,586,602 B2
(45) Date of Patent: Mar. 7, 2017

(54) BRAKE UNIT FOR A VEHICLE AND VEHICLE HAVING SUCH A BRAKE UNIT

(71) Applicant: SIEMENS AKTIENGESELLSCHAFT, Munich (DE)

(72) Inventors: Markus Bildstein, Oberstaufen (DE); Anton Gaile, Leutkirch (DE); Toni Schiffers, Erkelenz (DE)

(73) Assignee: Siemens Aktiengesellschaft, Munich (DE)

( * ) Notice: Subject to any disclaimer, the term of this patent is extended or adjusted under 35 U.S.C. 154(b) by 20 days.

(21) Appl. No.: 14/765,065

(22) PCT Filed: Jan. 8, 2014

(86) PCT No.: PCT/EP2014/050232
§ 371 (c)(1),
(2) Date: Jul. 31, 2015

(87) PCT Pub. No.: WO2014/117969
PCT Pub. Date: Aug. 7, 2014

(65) Prior Publication Data
US 2015/0367870 A1    Dec. 24, 2015

(30) Foreign Application Priority Data

Jan. 31, 2013 (DE) .................. 10 2013 201 635

(51) Int. Cl.
*B61H 15/00* (2006.01)
*B61H 5/00* (2006.01)
(Continued)

(52) U.S. Cl.
CPC ........ *B61H 15/0028* (2013.01); *B60T 13/588* (2013.01); *B60T 13/665* (2013.01);
(Continued)

(58) Field of Classification Search
CPC .... F16D 65/40; F16D 55/2245; F16D 55/224; F16D 65/56; B61H 15/0028;
(Continued)

(56) References Cited

U.S. PATENT DOCUMENTS 4,319,671 A    3/1982  Smith et al.
4,706,786 A *  11/1987 Nadas .................... B61H 15/00
                                                188/196 BA
(Continued)

FOREIGN PATENT DOCUMENTS

DE    1755343 A1    8/1971
DE    2810445 A1    9/1979
(Continued)

*Primary Examiner* — Melanie Torres Williams
(74) *Attorney, Agent, or Firm* — Laurence Greenberg; Werner Stemer; Ralph Locher

(57) ABSTRACT

A brake unit for a vehicle, in particular a rail vehicle, has a brake cylinder, a brake piston and a device for adjusting a clearance. The latter has two first stops that strike against each other when the brake unit is opened. One of the first stops is formed on a blocking element that is functionally connected to the brake piston. In order to be able to open the brake unit beyond the clearance, a blocking member is in engagement with the blocking element under the force of a pre-stressing spring. The blocking element is blocked by the blocking member when the first stops strike. Actuators displace the blocking member that is in engagement with the blocking element counter to a force of the pre-stressing spring into a position detached from the blocking element.

12 Claims, 7 Drawing Sheets

(51) Int. Cl.

| | |
|---|---|
| *B60T 17/16* | (2006.01) |
| *F16D 55/224* | (2006.01) |
| *B60T 13/58* | (2006.01) |
| *B60T 13/66* | (2006.01) |
| *B60T 17/22* | (2006.01) |
| *F16D 65/18* | (2006.01) |
| *F16D 65/56* | (2006.01) |
| *F16D 121/04* | (2012.01) |
| *F16D 121/14* | (2012.01) |
| *F16D 125/40* | (2012.01) |

(52) U.S. Cl.
CPC ............ *B60T 17/16* (2013.01); *B60T 17/228* (2013.01); *B61H 5/00* (2013.01); *F16D 55/224* (2013.01); *F16D 55/2245* (2013.01); *F16D 65/18* (2013.01); *F16D 65/56* (2013.01); *F16D 2121/04* (2013.01); *F16D 2121/14* (2013.01); *F16D 2125/40* (2013.01)

(58) Field of Classification Search
CPC ....... B61H 15/00; B60T 13/665; B60T 17/16; B60T 17/228
USPC ..................... 188/71.7, 72.7, 72.8
See application file for complete search history.

(56) References Cited

U.S. PATENT DOCUMENTS 5,103,940 A * 4/1992 Meneut ............... B66D 5/26
 188/72.6
7,434,669 B2  10/2008 Halasy-Wimmer et al.
2008/0087505 A1* 4/2008 Kobelt ............... F16D 55/2245
 188/72.7

FOREIGN PATENT DOCUMENTS

| DE | 10329694 A1 | 4/2004 |
|---|---|---|
| DE | 102006007684 A1 | 8/2007 |

* cited by examiner

BRAKE UNIT FOR A VEHICLE AND VEHICLE HAVING SUCH A BRAKE UNIT

BACKGROUND OF THE INVENTION

Field of the Invention

The invention relates to a brake unit for a vehicle, in particular a rail vehicle, having a brake cylinder, a brake piston which is axially guided in the brake cylinder, and means for adjusting a clearance, said means comprising two first stops that are assigned to each other and come to rest against each other when the brake unit is opened, wherein one of the first stops is formed on a locking element which is actively connected to the brake piston.

Such a brake unit is disclosed in the publication U.S. Pat. No. 4,319,671 A, for example, in which a piston is used as a locking element, said piston being actively connected to the brake piston via the hydraulic fluid and coming to rest against an edge of a casing section of the brake cylinder when the brake unit is opened.

For maintenance purposes, e.g. for the purpose of changing worn brake pads, it is preferably possible to open the brake unit beyond the clearance.

BRIEF SUMMARY OF THE INVENTION

The object of the invention is to allow such an opening of the brake unit in a simple and time-saving manner.

Taking as its starting point a brake unit for a vehicle, in particular a rail vehicle, having a brake cylinder, a brake piston which is axially guided in the brake cylinder, and means for adjusting a clearance with two first stops that are assigned to each other and come to rest against each other when the brake unit is opened, and wherein one of the first stops is formed on a locking element that is actively connected to the brake piston, this object is inventively achieved in that a locking member is engaged with the locking element under the force of a preloaded spring in such a manner that the locking element is blocked by the locking member when the first stops come to rest against each other, and that actuation means are suitably formed to displace the locking member that is engaged with the locking element, against the force of the preloaded spring, into a position released from the locking element. As a result of releasing the engagement, the brake piston can be displaced far beyond the clearance, thereby rendering the inventive brake unit particularly easy to maintain. In this way, only very simple operations are required in order to open the brake unit fully. Moreover, the simple structure of the brake unit result in a reduction in weight and costs.

The actuation means are preferably mechanical, such that the brake unit can be opened manually without difficulty for the purpose of maintenance tasks.

In a manner which is structurally simple to implement, the locking element can be a locking slide which overlaps a carrier that is formed on the brake piston, and the locking member can be a locking pawl which engages into teeth of the locking slide under the force of the preloaded spring.

Alternatively, the locking element can be a locking wheel and the locking member can be a threaded spindle which is coupled to the brake piston via a screw-thread drive and is supported at the brake cylinder via a bearing.

In this case, the threaded spindle is preferably a threaded spindle which is concentrically screwed into the brake piston and is not self-locking.

Furthermore, the actuation means in this case preferably comprise a tie rod, a tie rod screw, and a pin which can be axially displaced by rotating the tie rod screw via a guide in the tie rod, wherein the preloaded spring is supported at the tie rod and wherein the threaded spindle comprises actuation surfaces which project into the path of movement of the pin, said actuation surfaces being so formed that the threaded spindle is displaced into the position released from the locking element when the pin is displaced against the force of the preloaded spring.

By means of briefly rotating the tie rod, it is therefore possible to produce an axial displacement of the non-self-locking threaded spindle against the preloaded spring, and hence to release the toothed engagement between the locking wheel (locking element) and the threaded spindle, and to move the brake piston back completely, e.g. under the spring force of return springs. In this case, the tie rod screw may be coupled to a tool via an interface, said tool allowing the tie rod screw to be turned from an easily accessible position. It is also advantageous here that the mechanical components which are involved in the adjustment of the clearance and in returning the brake piston for the purpose of fully opening the brake unit are situated in the hydraulic region, thereby significantly reducing the risk of jamming or wear to these components.

It is considered advantageous for the locking element and the locking member to have reciprocal teeth for the purpose of engagement. The connection between locking element and locking member may also be embodied as a frictional connection instead of the toothed engagement.

It is also considered advantageous for an arresting pawl to be suitably formed to block the locking element when the brake unit is in a closed position. The brake unit functions as a parking brake (restraining brake) when the locking element is blocked thus.

It is also considered advantageous for the means for adjusting the clearance to comprise two second stops that are assigned to each other and come to rest against each other when the brake unit is closed, wherein one of the second stops is formed on the locking element into which the locking member, under the force of the preloaded spring, engages in such a way that the locking element can continue to catch or slip relative to the locking member under the force of the brake piston when the second stops come to rest against each other, and therefore the clearance is automatically readjusted when the frictional partners wear.

The invention also relates to a vehicle, in particular a rail vehicle, having a chassis to which a brake unit according to the invention is attached for the purpose of frictional engagement using braking means of a wheelset of the chassis.

BRIEF DESCRIPTION OF THE SEVERAL VIEWS OF THE DRAWING

The invention is further explained with reference to figures, in which:

FIGS. 3 and 4, and FIGS. 7 to 12 show parts of the brake piston entity as per FIGS. 5 and 6 in various positions of its motion sequence.

DESCRIPTION OF THE INVENTION

Figure 1:
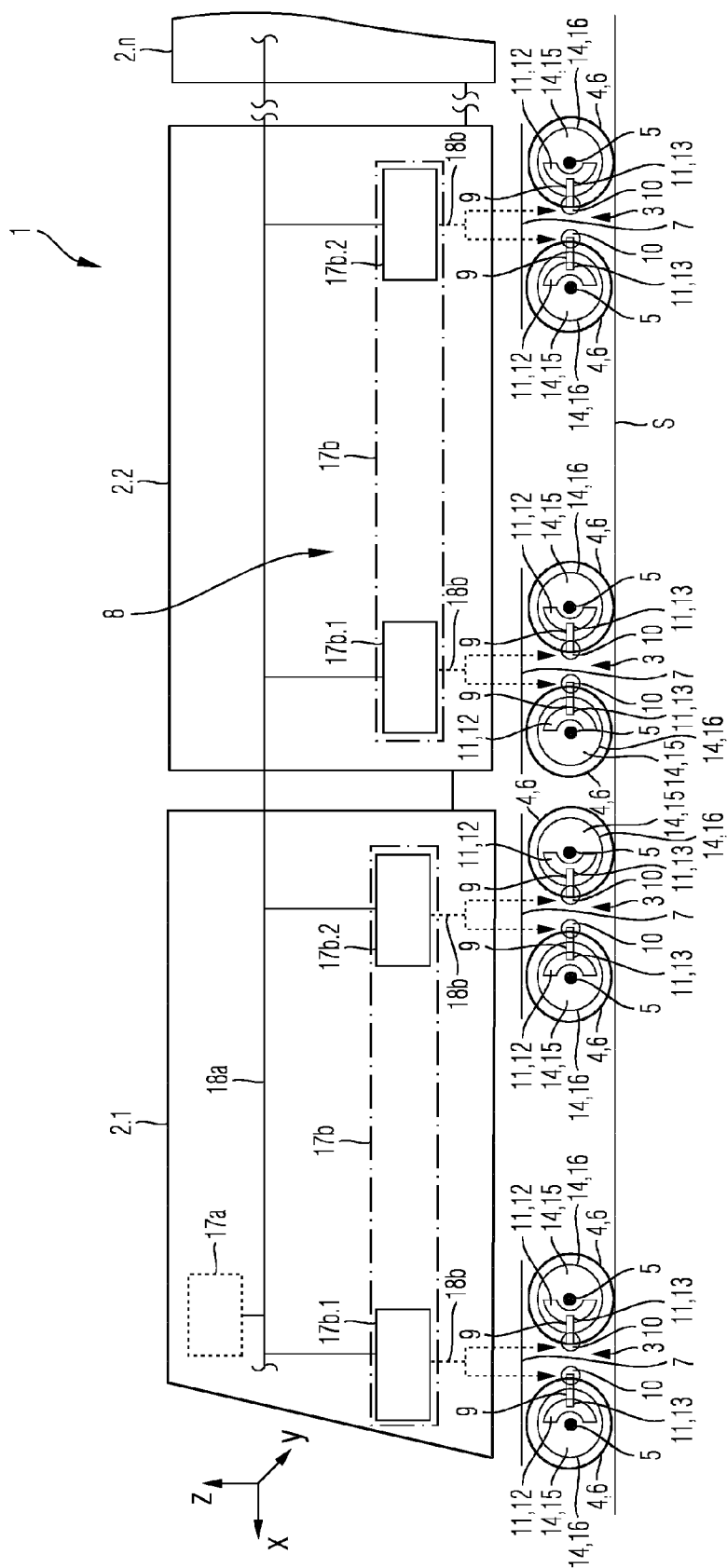
FIG. 1 shows a vehicle according to the invention in the form of a rail vehicle, wherein wheel sets of bogies are each assigned at least one brake unit according to the invention.

According to FIG. 1, the rail vehicle 1 has cars 2.1, 2.2, . . . , 2.n whose car bodies are each supported via a secondary suspension system by two chassis in the form of bogies 3 in a manner which is not shown here. The bogies 3 have two wheel sets 4 in each case. Each of the wheel sets 4 has a shaft 5 and wheels 6 which are held at the ends thereof. In this case, the shafts 5 of the wheel sets 4 are rotatably mounted in wheel set bearings in a manner which is not shown, said wheel set bearings being linked via a casing and a primary suspension system to a bogie frame 7 of the respective bogie 3. The rail vehicle 1 further comprises a brake system which is designated 8 as a whole.

Each shaft 5 of the rail vehicle 1 is normally assigned at least one inventive brake unit 9 in each case. Therefore each of the cars 2.1, 2.2, . . . , 2.n has at least four of these brake units 9.

Each of the brake units 9 has a brake actuator 10 and first brake means 11, which are actuated by the brake actuator 10 and take the form of a brake application entity 13 that is equipped with brake pads 12. In this case, the first brake means 11 of each of these brake units 9 interacts in each case with second brake means 14 in the form of a brake disc 16 that is equipped with braking surfaces 15. The braking surfaces 15 here take the form of two brake disc sections 16.1, 16.2, which are attached to the two sides of a wheel 6 that is assigned to the brake unit 9, such that the wheel 6 having the two brake disc sections 16.1, 16.2 represents the brake disc 16 in the form of a wheel brake disc (see FIGS. 2 and 3).

Instead of the wheel brake disc, however, it is also possible to provide an axle-mounted brake disc, in which case a separate disc having braking surfaces is arranged in a non-rotatable manner on the shaft 5 in addition to the wheel. Moreover, the first brake means can also interact with a second brake means in the form of the wheel or in the form of a brake drum.

Under the influence of the brake actuator 10, the brake application entity 13 which is equipped with the brake pads 12 can be applied across the brake disc 16 for the purpose of producing a frictional engagement between the first brake means 11 and the second brake means 14.

The brake actuator 10 is an electro-hydraulic brake actuator.

The brake system 8 has a central control device 17a and, in each of the cars 2.1, 2.2, . . . , 2.n, a brake controller 17b in the form of one or two brake control devices 17b.1 and 17b.2. In this case, the brake control devices 17b.1 and 17b.2 can be activated from the central control device 17a of the brake system 8 via a wire train bus 18a, said central control device 17a being provided as part of a central vehicle control system, for example.

The brake actuators 10 of the brake units 9, or groups of said brake actuators, receive one brake instruction in each case via the brake controller 17b. The brake instructions may be transferred to the brake actuators 10 via one or more control lines 18b and/or a BUS and/or via radio in this case.

Figure 2:
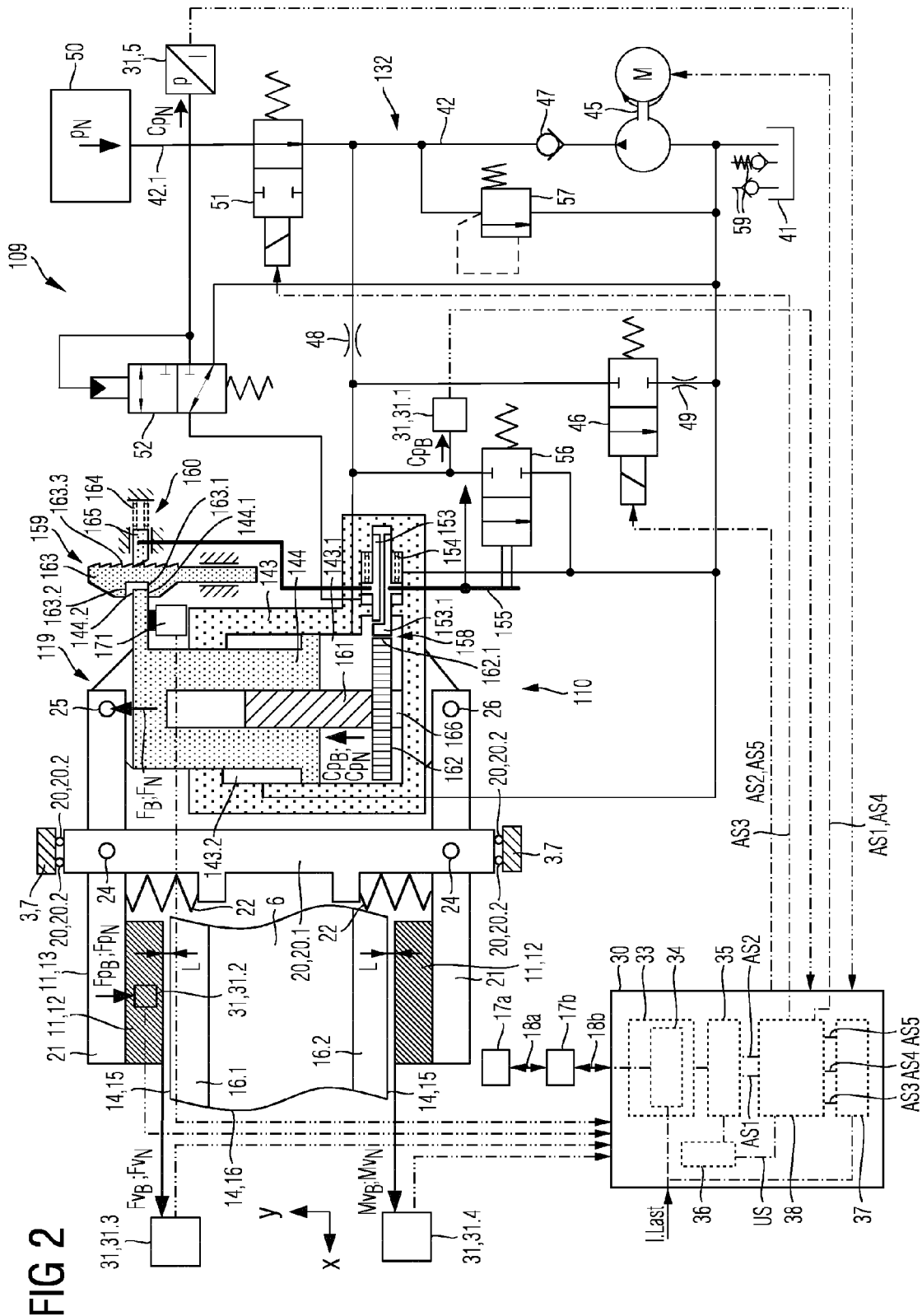
FIG. 2 shows a first embodiment variant of the brake unit according to the invention.

FIG. 2 schematically shows a first embodiment variant 109 of the inventive brake unit with a first embodiment variant 110 of the brake actuator.

Figure 3:
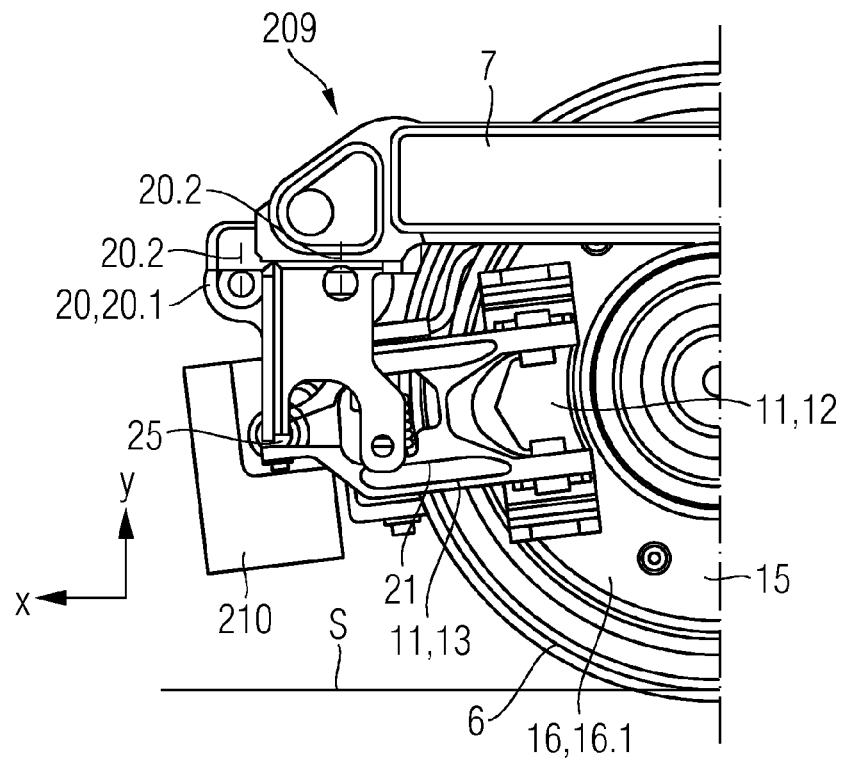
FIGS. 3 and 4 show a second embodiment variant of the brake unit according to the invention.
Figure 4:
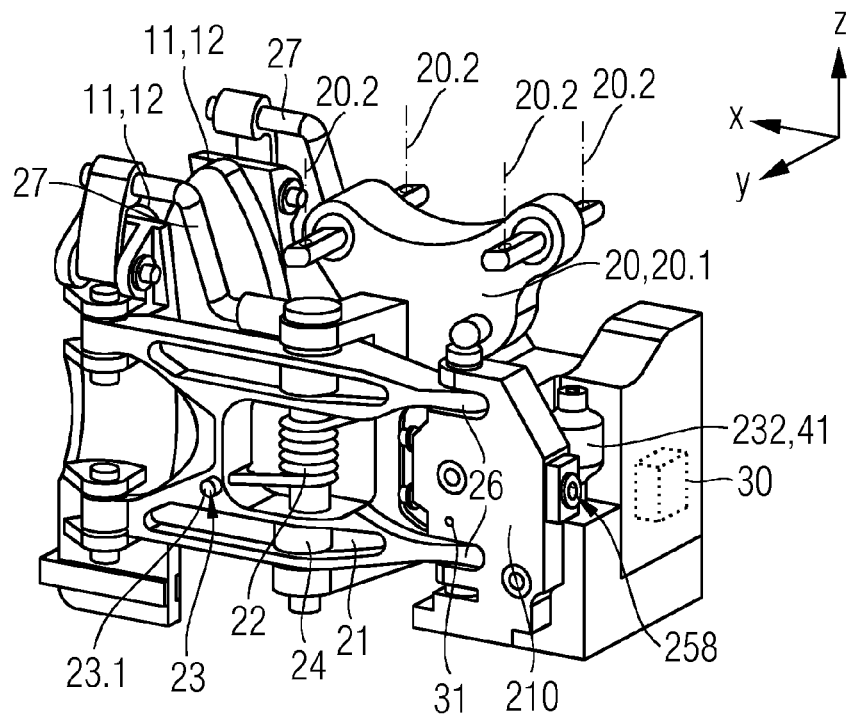
Figure 5:
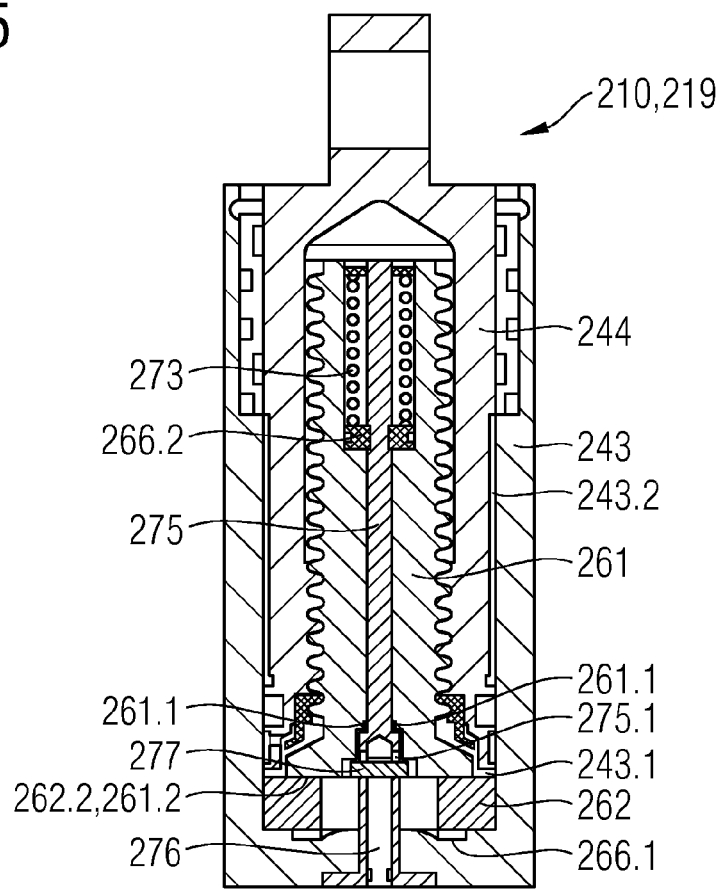
FIGS. 5 and 6 show various sectional views of a brake piston entity of the brake unit as per
Figure 6:
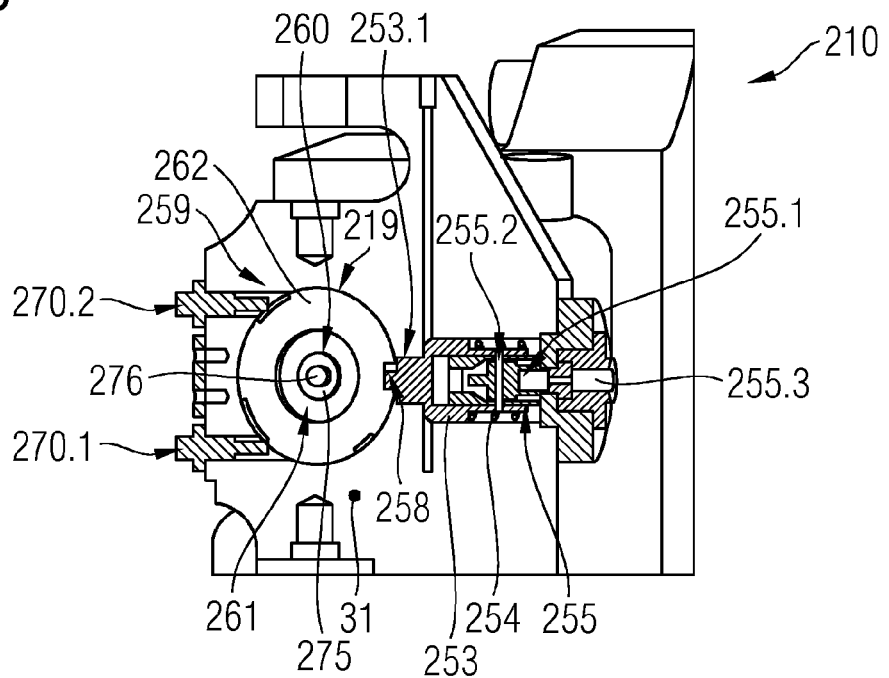

FIGS. 3 and 4 show a second embodiment variant 209 of the inventive brake unit with a second embodiment variant 210 of the brake actuator, and FIGS. 5 to 12 show details of this second embodiment variant 210 of the brake actuator.

However, the two embodiment variants 109 and 209 of the brake unit essentially differ only in the structural configuration of a brake piston entity, respectively designated 119 and 219 as a whole, of their respective brake actuators 110 and 210, and therefore the components of the two embodiment variants 109 and 209 of the brake unit, said variants being developed in an essentially identical manner, are each designated by the same reference signs in the FIGS. 2 and 3 to 12.

For the purpose of attachment to (suspension from) the bogie frame 7, both embodiment variants 109 and 209 of the brake unit 9 have a connecting part, designated 20 as a whole, on which the brake application entity 13 is held. The connecting part 20 comprises a brake bridge 20.1 and is permanently fixed to the bogie frame 7 by means of bolted connections 20.2. However, the brake units 109; 209 may also be attached to the chassis at a different position, e.g. to a transmission casing or a wheelset flange of the bogie.

The brake application entity 13 is formed as a brake caliper by means of two brake levers 21. Alternatively, the brake application entity could however also be formed as a brake saddle.

The position of the brake unit 109; 209 on the bogie frame 7 can be adjusted by means of the bolted connections 20.2 during the initial installation of the brake unit 109; 209 on the bogie frame 7, but subsequent adjustment is very resource-intensive.

As a result of uneven wear to the brake pads 12 and the braking surfaces 15 of the brake disc 16, owing to relative movement of the bogie 3, or even sluggishness of the brake application entity 13, it may nonetheless occur during operational use and after the initial installation of the brake unit 109; 209 that only one of the brake pads 12 will abut the respective braking surface 15 of the brake disc 16, and/or that a clearance L of different sizes will exist between the two brake pads 12 and the braking surfaces 15. Unilateral abutment of the brake means 11, 14 may therefore occur during operational use.

Therefore a spring element 22 is assigned to each of the two brake levers 21. A first end of each spring element 22 is supported at the respective brake lever 21, and a second end is supported at the brake bridge 20.1 of the connecting part 20.

The prestressing force of each of the two spring elements 22 is adjustable. However, this is only shown for the second embodiment variant 209 of the brake unit here. According to FIGS. 3 and 4, the adjustment of the prestressing force of each of the spring elements 22 is effected in each case by means of an adjustment entity that is designated 23 as a whole.

The adjustment entities 23 comprise in each case an adjustment screw 23.1 (also referred to as an "adjusting screw" or "stop screw"), a threaded hole in the assigned brake lever 20 for engagement with the adjustment screw 23.1, and a guide slot which is formed in the respective brake lever for guiding that end of the spring element which is supported at the brake lever, said end taking the form of a lever-type limb.

The adjustment of the prestressing forces of the spring elements 22 provides the means whereby a unilateral abutment of the brake means 11, 14 can be dealt with quickly and easily during operational use. It is therefore possible e.g. to compensate for a relative offset of the attachment of the brake unit 109; 209 in a transverse direction y relative to the braking surfaces 15 of the brake disc 16, and hence to centralize the brake unit 109; 209 relative to the brake disc 16.

The two brake levers 21 are pivotably connected to the connecting part 20 by means of connecting bolts 24 in each case, thus forming the brake caliper.

First lever arms of the brake levers 21 are pivotably connected to supports 25,26 of the brake actuator 110; 210. A reciprocating motion of the support 25 pushes the supports 25, 26 away from each other, thereby spreading the first lever arms apart. The brake pads 12 are arranged at second lever arms of the brake levers 21, and are applied across the brake disk 16 when the first lever arms are spread apart.

In addition to the function of equalizing the clearance L of the brake pads 12 on both sides of the brake disc 16 (centering function), the spring elements 22 also perform a return function. The return function consists in opening the brake caliper when the brake actuator 110; 210 does not introduce any actuation force into the brake application entity for the purpose of applying the brake application entity 13.

The second embodiment variant 209 of the inventive brake unit is also equipped with an entity, designated 27 as a whole, which is provided to ensure the parallel movement of the brake pads but is not described in further detail here.

The two embodiment variants 110 and 210 of the brake actuator comprise in each case a local electronics module 30, a sensor entity 31 and an electro-hydraulic set point value force conversion entity 132; 232, wherein the brake actuator 110; 210 with its components 30, 31 and 132; 232 and the first brake means 11 are connected by means of the connecting part 20 to form an assembly.

Essential details of the local electronics module 30, the sensor entity 31 and the electro-hydraulic set point value force conversion entity 132; 232 are described in greater detail below with reference to the first embodiment variant 110 of the brake actuator as shown in FIG. 2. Where corresponding parts of the second embodiment variant 210 of the brake actuator are shown in the FIGS. 3 to 6, said parts are designated correspondingly.

The local electronics module 30 comprises a set point value capture unit 33, which is equipped with a set point value correction entity 34. The local electronics module also comprises a set point value regulating entity 35, a monitoring entity 36, a fallback entity 37 and a switching entity 38.

Depending on the brake instruction, the set point value capture unit 33 requests a brake set point value from at least one of the brake control devices 17a.1 or 17b.2 of the brake controller 17b. The set point value correction entity 34 performs a wheel slide protection correction of the brake set point value as a function of a reduction signal of a wheel slide protection entity (not shown here), and a load correction of the brake set point value as a function of a current load value I.Last, wherein the brake set point value thus corrected is transferred to the set point value regulating entity 35 as set point value $S.Cp_B$; $S.Fp_B$ of a surface pressure variable $Cp_B$; $Fp_B$ or as set point value $S.Fv_B$; $S.Mv_B$ of a retardation variable $Fv_B$; $Mv_B$.

For the purpose of determining the current load value I.Last, the load state of the cars 2.1, 2.2, . . . , 2.n of the rail vehicle 1 is captured at at least one position in the vehicle, and reliably communicated to an assigned brake unit 109; 209 or to a group of brake units, e.g. a group of the brake units in one of the bogies.

The electro-hydraulic set point value force conversion entity 132; 232 comprises a container 41 for the provision of hydraulic fluid, a brake cylinder 143; 243 with brake piston 144; 244, this being connected to the container 41 via a hydraulic line system 42, and control means 45, 46. The control means 45, 46 are suitably formed to adjust a current value $I.Cp_B$, applied to the brake piston 144; 244, of a hydraulic pressure $Cp_B$ in the brake cylinder 143; 243, under the influence of electrical output signals AS1, AS2 which come from the set point value regulating entity 35 and are output via the switching entity 38.

A current value $I.Fp_B$ of a surface pressure $Fp_B$, resulting from the application of the hydraulic pressure $Cp_B$ to the brake piston 144; 244, is converted by frictional engagement of the first brake means 11 with the second brake means 14 into a current value $I.Fv_B$ of a retardation force $Fv_B$ or a current value $I.Mv_B$ of a retardation torque $Mv_B$.

One of the control means is a pump assembly 45, by means of which hydraulic fluid can be pumped from the container 41 into the brake cylinder 43. The control means also comprise a brake valve 46. The brake valve 46 is suitably formed to allow hydraulic fluid to flow out of the brake cylinder 43 into the container 41.

The sensor entity 31, which is part of the brake unit 109 or 209, determines the current value $I.Fp_B$ of the hydraulic pressure by means of a first sensor 31.1 (pressure pickup), or the current value $I.Fp_B$ of the surface pressure as the current value of the surface pressure variable by means of a second sensor 31.2, and/or the current value $I.Fv_B$ of the retardation force by means of a third sensor 31.3, or the current value $I.Mv_B$ of the retardation torque as the current value of the retardation variable by means of a fourth sensor 31.4.

The set point value regulating entity 35 is likewise part of the electronics module 30 of the brake unit 109 or 209 and is suitably formed to output the output signals AS1, AS2 such that the captured current value $I.Fv_B$; $I.Mv_B$ of the retardation variable $Fv_B$; $Mv_B$ corresponds to the set point value $S.Fv_B$; $S.Mv_B$ of the retardation variable $Fv_B$; $Mv_B$, for the purpose of regulating the retardation variable $Fv_B$; $Mv_B$, or to input the output signals AS1, AS2 such that the captured current value $I.Cp_B$; $I.Fp_B$ of the surface pressure variable $Cp_B$; $Fp_B$ corresponds to the set point value $S.Cp_B$; $S.Fp_B$ of the surface pressure variable $Cp_B$; $Fp_B$, for the purpose of regulating the surface pressure variable $Cp_B$; $Fp_B$.

The increase and decrease of a regulated braking force $F_B$ and the provision of a passive load-corrected emergency braking force $F_N$ of the brake piston 144; 244 are described in further detail below.

The brake disc 16 is braked by pressing the brake pads 12 onto the braking surfaces 15. The pressure is applied under the influence of the regulated braking force $F_B$ or under the influence of the passive load-corrected emergency braking force $F_N$ of the brake piston 144; 244, this being contained in the brake cylinder 143; 243 and acting under the influence of the hydraulic pressure $Cp_B$ that is increased in a regulated manner in the brake cylinder 143; 243 or under the influence of a passive load-corrected hydraulic pressure $Cp_N$ that is supplied to the brake cylinder. The regulated braking force $F_B$ or the emergency braking force $F_N$ of the brake piston 44 is converted via the brake application entity 13 into the regulated surface pressure $Fp_B$ or the passive surface pressure $Fp_N$, meaning that it is transferred via the brake application entity 13 onto the brake pads 12 as surface pressure $Fp_B$ or $FP_N$.

In this case, the increase of the regulated braking force $F_B$ is effected via the regulated increase of the hydraulic pressure $Cp_B$ in an extension chamber 143.1; 243.1 of the brake cylinder 43 by means of the pump assembly 45. To this end, the pump assembly 45 pumps hydraulic fluid in the form of hydraulic oil from the container 41 into the extension chamber 143.1; 243.1 of the brake cylinder 143; 243 via a non-return valve 47. The non-return valve 47 prevents a reverse flow of hydraulic oil into the container 41 if the pump assembly 45 is switched off.

The regulated decrease of the braking force $F_B$ is achieved via a regulated decrease of the hydraulic pressure $Cp_B$ in the extension chamber 143.1; 243.1 of the brake cylinder by means of the brake valve 46. The brake valve 46 is preferably a discretely switching seat valve with very low leakage.

Hydraulic chokes 48 and 49 restrict the speed of the increase of the hydraulic pressure in the extension chamber 143.1; 243.1 of the brake cylinder 143; 243 and of the decrease of the hydraulic pressure in the extension chamber 143.1; 243.1 of the brake cylinder 143; 243.

Since the weight and hence the braking mass of the rail vehicle 1 may vary as a function of the load state, an emergency braking force $F_N$ which is set too high may result in over braking, or an emergency braking force $F_N$ which is set too low may result in under braking of the rail vehicle 1. The over braking could result in sliding and in flat spots on wheel 6 and rail S. The under braking could result in unacceptably long braking distances.

In order to avoid this, the inventive brake unit 9; 109; 209 has means for providing the emergency braking force $F_N$ as a load-corrected emergency braking force. In this case, the adjustment of said emergency braking force (i.e. the adaptation of the emergency braking force to the current weight of the vehicle) is effected within the permitted limits (empty/loaded) when:

a) the vehicle is stationary or/and
b) a door release has been cancelled and/or the doors are closed and/or
c) a brake released instruction is pending and/or
d) an authority to move is pending and/or
e) the speed of the vehicle is less than 10 km/h.

The provision of the load-corrected emergency braking force $F_N$ is effected by supplying the passive load-corrected hydraulic pressure $Cp_N$ to the extension chamber 143.1; 243.1 of the brake cylinder. To this end, the set point value force conversion entity 132; 232 has a pressure transducer 50 which is attached under a preloaded pressure $p_N$ to a connection interface section 42.1 of the hydraulic line system 42, and further control means 51, wherein the further control means 51 is suitably formed, under the influence of a electrical output signal AS3 which comes from the fallback entity 37 and is output via the switching entity 38 when a switching signal US is received from the monitoring entity, to enable the pressure transducer 50 such that the current value $I.p_N$ of the preloaded pressure $p_N$ that is to be applied to the brake piston is supplied to the extension chamber of the brake cylinder as current value $I.Cp_N$ of the hydraulic pressure $Cp_N$.

The pressure transducer 50 is a compressed gas accumulator or alternatively a spring-type accumulator.

Load correction of a predetermined emergency braking set point value is effected by means of the fallback entity 37 as a function of the current load value I.Last, the thus load-corrected emergency braking set point value being provided as a load-corrected set point value $S.p_N$ of the preloaded pressure of the pressure transducer 50.

The set point value force conversion entity 132; 232 comprises load correction means by means of which, for the purpose of increasing the passive load-corrected preloaded pressure $p_N$ of the pressure transducer 50, the hydraulic pressure $Cp_N$ in the connection interface section 42.1 of the hydraulic line system can be adjusted to the load-corrected set point value $S.Cp_N=S.p_N$ as a function of electrical output signals AS4, AS5 from the fallback entity.

The control means 45, 46 also comprise the load correction means here, and are suitably formed to adjust the current value $I.Cp_N$ of the hydraulic pressure in the connection interface section 42.1 for the purpose of preloading the pressure transducer 50, under the influence of the electrical output signals AS4, AS5 which come from the fallback entity 37 and are output via the switching entity 38, wherein hydraulic fluid can be pumped out of the container 41 into the connection interface section 42.1 by means of the pump assembly 45, and wherein hydraulic fluid can flow out of the connection interface section 42.1 into the container 41 by means of the brake valve 46. A fifth sensor, which is attached to the connection interface section 42.1 and takes the form of a pressure pickup, determines the current value $I.Cp_N$ of the hydraulic pressure in the connection interface section 42.1 and hence the current value $I.p_N$ of the preloaded pressure at the same time, wherein the fallback entity 37 is suitably formed, for the purpose of regulating the preloaded pressure $p_N$ of the pressure transducer 50, to output the output signals AS4, AS5 such that the captured current value $I.Cp_N=I.p_N$ corresponds to the load-corrected set point value $S.Cp_N=S.p_N$.

The further control means 51 take the form of a quick-action braking valve. When the quick-action braking valve 51 is open (for outflow), the pressure transducer 50 is filled. The preloaded pressure of the pressure transducer is therefore increased by means of the pump assembly 45 (motor pump unit) if the pretention pressure is too low due to loading conditions, and is decreased in a controlled manner by means of the brake valve 46 if the preloaded pressure is too high due to loading conditions. When the pressure transducer 50 is full, the quick-action braking valve 51 is closed again and remains closed during normal operation.

When the pressure transducer 50 is full, a locking piston 153; 253 is also held back against the force of a preloaded spring 154; 254 by a hydraulically actuated valve 52, which is preferably so embodied as to be adjustable.

The locking piston can also be pulled back and a pressure release valve 56 opened by means of mechanical actuation 155; 255. A manual release of the brake unit 109; 209 is thereby possible.

However, the locking piston 153; 253 could also be pulled back by hydraulic actuation.

During operation, if the electronics module 30 detects that passive braking via the preloaded pressure $p_N$ of the pressure transducer 50 is necessary, the quick-action braking valve 51 is opened by issuing the output signal A3 in order thereby to supply the preloaded pressure $p_N$ of the pressure transducer 50 via the hydraulic pressure $Cp_N$ to the brake cylinder 143; 243. The fifth sensor 31.5 in the form of the pressure pickup continuously measures the current value $I.Cp_N=I.p_N$ and uses this in particular to maintain the preloaded pressure $p_N$ of the pressure transducer 50 within predetermined operating limit values and in order to show the availability of said preloaded pressure $p_N$ and hence the availability of the passive braking. If the preloaded pressure $p_N$ of the pressure transducer decreases too far, topping up of the pressure transducer 50 becomes necessary. Furthermore, a pressure relief valve 57 acts as a passive safety entity to limit the hydraulic pressure $Cp_N$.

The container 41 is an oil tank which is sealed relative to the surrounding atmosphere in order to minimize the entry of humidity. Only in the event of under pressure occurring in the oil tank is said under pressure equalized by means of a valve arrangement 59.

The two brake piston entities 119; 219 have arresting means which are designated 158; 258 as a whole and are suitably formed, when in a locking position, to mechanically arrest the brake piston in order to provide a parking brake.

The two brake piston entities 119; 219 also have means, designated 159; 259 as a whole, for presetting the clearance L between the first brake means 11 and the second brake means 14 to a predetermined clearance value S.L. These means 159; 259 are suitably formed to readjust the clearance L to the predetermined clearance value S.L automatically in the event of wear to the brake means 11, 14.

The two brake piston entities 119; 219 further comprise returning means, designated 160; 260 as a whole, by means of which the brake unit can be switched into a fully open state, e.g. for the purpose of changing the brake pads. In this case, fully open signifies a state in which the distance between the first brake means 11 and the second brake means 14 is significantly greater than the predetermined clearance value S.L of the clearance L.

In the case of the first embodiment variant 109 of the inventive brake unit as shown in FIG. 2, the arresting means 158 for mechanically arresting the brake piston are spatially separated from the means 159 for presetting the clearance L and the returning means 160.

The mechanical arresting of the brake piston 144 and therefore the long-lasting mechanical maintenance of the braking force $F_B$ or the surface pressure $Fp_B$—i.e. a parking brake function—is first explained in greater detail in the following.

As a consequence of leakage from hydraulic components of the electro-hydraulic set point value force conversion entity 132, to which the hydraulic pressure $Cp_B$ is applied, the hydraulic pressure $Cp_B$ and therefore ultimately also the surface pressure $Fp_B$ can drop over time. In order to limit such a decrease of the surface pressure $Fp_B$, it is optionally possible to mechanically arrest the movement of the brake piston 144 when the parking brake is used. This is achieved by means of the arresting means 158.

For this purpose, the arresting means 158 comprise a non-self-locking threaded spindle 161 which is concentrically screwed into the brake piston 144 and is supported at the brake cylinder 143. A locking wheel 162, which is connected to the threaded spindle 161, is prevented from rotating when the locking piston 153 is in its locking position because, in said locking position, an arresting pawl 153.1 of the locking piston 153 engages in a locking groove 162.1 of the locking wheel 162. Any movement of the brake piston 144 is therefore prevented and therefore the currently applicable value I.$Fp_B$ for parking (restraining) the rail vehicle 1 is maintained. The locking piston 153 can be pulled back out of its locking position into a released position and the pressure release valve 56 can be opened by means of the mechanical actuation 155. The manual release of the brake unit 109 is thereby possible.

The readjustment of the clearance L is explained in the following.

In a released position of the brake unit, in which the force of the return springs 22 is greater than the surface pressure $Fp_B$ resulting from the braking force $F_B$, a first stop 144.1 of the brake piston 144 abuts an assigned first stop 163.1 of a locking element 163, this taking the form of a locking slide, under the force of the return springs 22. When the hydraulic pressure $Cp_B$ increases, a rotation of the threaded spindle 161 causes the brake piston 144 to move an adjustment distance corresponding to the predetermined clearance value S.L, from the first stop 163.1 to a second stop 163.2 of the locking slide. If the brake means 11, 14 are not worn, a second stop 144.2 of the brake piston 144 comes to rest against the second stop 163.2 at a predetermined maximum value of the braking force $F_B$. However, if due to wear of the brake means 11, 12 the second stop 163.2 is reached before the maximum value of the braking force $F_B$, a further increase of the hydraulic pressure $Cp_B$ causes the brake piston 144, and with it the locking slide 163 on which the two stops 163.1 and 163.2 are formed, to move a readjustment distance further. A readjustment of the brake piston 144 is effected thus.

The locking slide 163 is provided with fine teeth 163.3, into which a locking member 165 in the form of a locking pawl engages under the force of a preloaded spring 164, such that the locking slide 163 which is displaced by the readjustment distance is arrested again at the end of the readjustment.

When the hydraulic pressure $Cp_B$ decreases, the brake piston 144 does not travel back the readjustment distance, but only travels back the adjustment distance from the second stop 163.2 to the first stop 163.1, thereby reestablishing the predetermined clearance value S.L of the clearance L.

The return of the brake piston 144 is explained in greater detail in the following. The locking pawl 165 forms the locking member which is held, by means of the preloaded spring 164, in a position engaged with the locking slide 163, wherein the locking slide 163 restricts the opening of the brake to the predetermined clearance value since the first stops 144.1 and 163.1 come to rest against each other. The mechanical actuation 155, which also serves as an actuation means for actuating the locking member 165, is suitably formed to displace the locking member 165 against the force of the preloaded spring 164 into a position released from the locking slide 144.

In the case of the second embodiment variant 209 of the inventive brake unit as shown in FIGS. 3 to 12, the arresting means 258 for mechanically arresting the brake piston 244, the means 259 for presetting the clearance L, and the returning means 260 are not spatially separated from each other.

Here likewise, the movement of the brake piston 244 can be mechanically arrested by means of the arresting means 258 when a parking brake is used.

For this purpose, the arresting means 258 again comprise a non-self-locking threaded spindle 261 which is concentrically screwed into the brake piston 244 and is supported at the brake cylinder 243. A locking wheel 262, which is connected via teeth 262.2, a toothed face here, to teeth 261.2 of the threaded spindle 261, is prevented from rotating by the arresting pawl 253.1 of the locking piston 253. Movement of the brake piston 244 is thereby prevented and the braking force $F_B$ is therefore maintained. The locking piston 253 can be pulled back and the pressure release valve 56 opened by means of the mechanical actuation 255. A manual release of the brake unit 209 is thereby possible. The mechanical actuation 255 comprises a draw-piston 255.1 with a cross pin 255.2 which engages in the locking piston 253, and a guide 255.3 for said draw-piston.

The readjustment of the clearance is explained in greater detail below.

In a released position of the brake unit 209, in which the force of the return springs 22 is greater than the surface pressure $Fp_B$ resulting from the braking force $F_B$, a first stop 262.3 of the locking wheel 262, under the force of the return springs 22, abuts an assigned first stop 270.1 which is supported at the brake cylinder. When the hydraulic pressure $Cp_B$ increases, a rotation of the threaded spindle 261 causes the brake piston 244 to moves an adjustment distance until a second stop 262.4 of the locking wheel comes to rest against an assigned second stop 270.2, which is likewise supported at the brake cylinder.

If the brake means 11, 14 are not worn, the locking wheel 262 comes to rest against the second stop 270.2 when the brake unit is closed at a predetermined maximum value of the braking force $F_B$. However, if due to wear of the brake means 11, 12 the second stop 270.2 is reached before the maximum value of the braking force $F_B$, a further increase of the hydraulic pressure $Cp_B$ causes a rotation between locking wheel 262 and threaded spindle 261, these being connected via the fine teeth 262.2 and 261.2. When the hydraulic pressure $Cp_B$ decreases, the brake piston 244 travels back the adjustment distance again, without the readjustment distance, until the locking wheel comes to rest against the first stop 270.1, thereby reestablishing the predetermined clearance L. The two stops 270.1 and 270.2 are so embodied as to be adjustable. A frictional connection between the locking wheel and the threaded spindle, e.g. using a cone, may also be selected instead of the connection via the teeth 262.2 and 261.2.

The returning means 260 are used again for the purpose of fully opening the brake unit 209. Said returning means also comprise actuation means 275, 276, 277, wherein the threaded spindle 261 as a locking member is held in an engaged position with the locking element 262 by means of the preloaded spring 273 here, and the actuation means 275, 276, 277 are suitably formed to displace the threaded spindle 261 against the force of the preloaded spring 273 into a position released from the locking element 262.

The actuation means 275, 276, 277 comprise a tie rod 275, a tie rod screw 276, and a pin 277 which can be axially displaced by rotating the tie rod screw 276 via a guide 275.1 in the tie rod, wherein the preloaded spring 273 is supported at the tie rod 275 and wherein the threaded spindle 261 comprises actuation surfaces 261.1 which project into the path of movement of the pin 277, said actuation surfaces 261.1 being so formed that the threaded spindle 261 is displaced into the position released from the locking element 262 when the pin 277 is displaced against the force of the preloaded spring 273.

The activation of the parking brake with simultaneous readjustment of the clearance L is explained again in further detail below with reference to the FIGS. 7 to 12.

Figure 7:
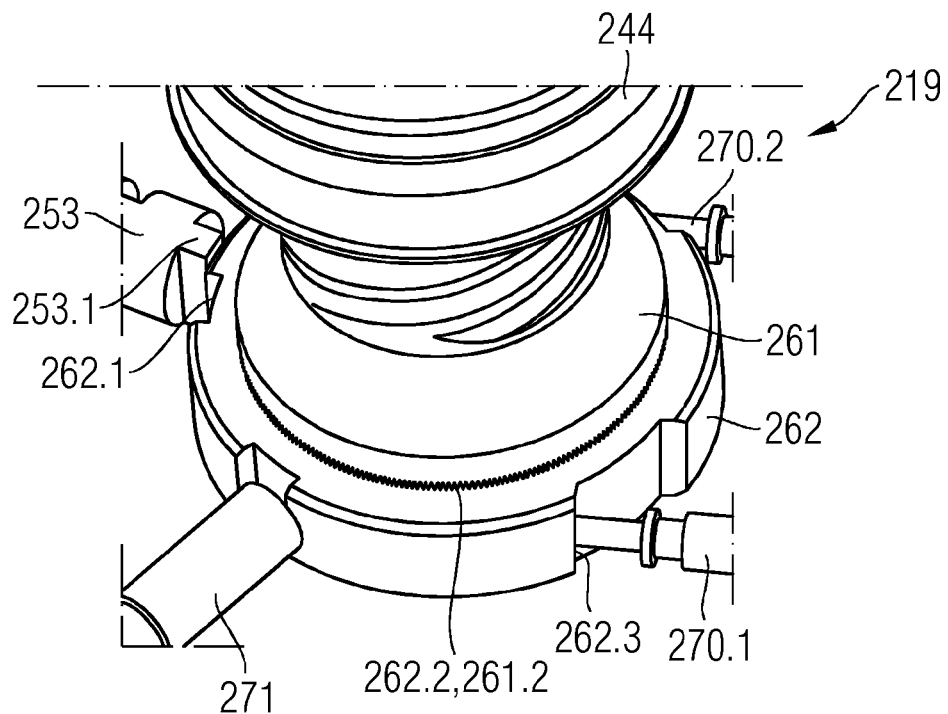

FIG. 7 shows an initial state, in which the brake unit 209 is open at maximum clearance.

A constant brake-opening hydraulic force $Cp_B$ acts on the brake piston 244 because an entry chamber 243.2 (cf. FIG. 5) is permanently pressurized from the storage container 41. The brake piston 244 is blocked in the position which corresponds to the maximum clearance. As described above, the blocking of the brake piston is caused by the threaded spindle 261, which cannot rotate because the locking wheel 262 is resting against the first stop 270.1. The torque of the threaded spindle 261 is transferred to the locking wheel 262 by the engagement of the reciprocal teeth 261.2, 262.2. The engagement of the teeth cannot be released, since the threaded spindle 261 is axially loaded by the force of the brake piston 244.

A proximity switch 271 is open because an indicator groove 262.5 of the locking wheel is in its detection zone. The arresting pawl 253.1 is hydraulically withdrawn.

Figure 8:
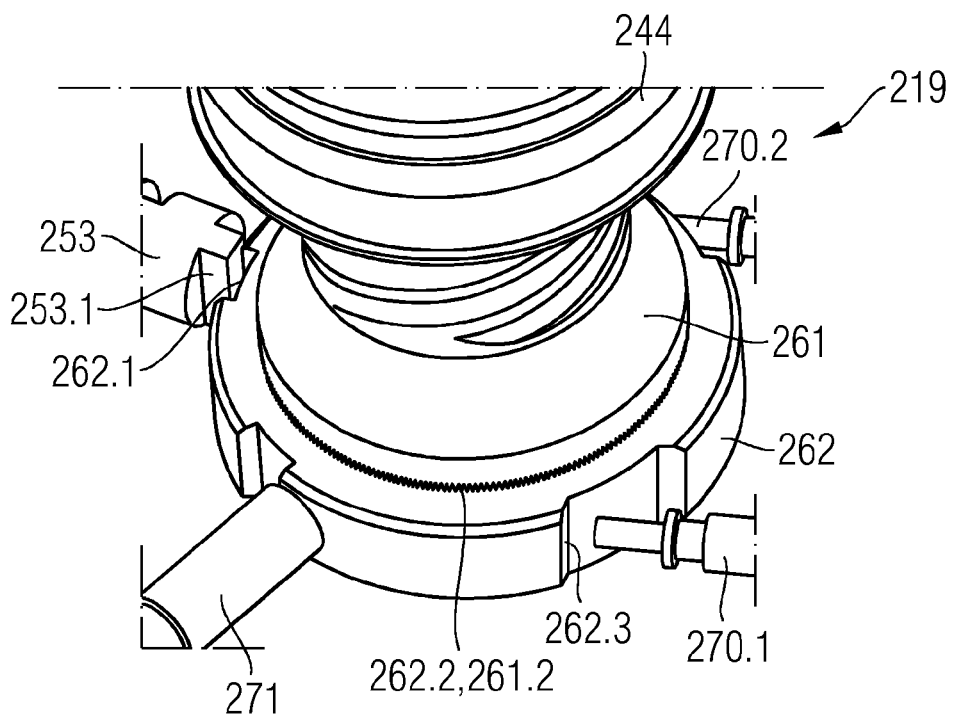

FIG. 8 an intermediate state of the brake unit 209, in which the clearance L of the brake pads has been overcome and the brake pads abut the brake disc without force.

This state was achieved by increasing the hydraulic pressure $Cp_N$ in the extension chamber 243.1 of the brake cylinder 243. The force of the return springs 22 was overcome and the brake piston 244 has moved into the position illustrated. The threaded spindle 261 has rotated accordingly, since the brake piston 244 is non-rotatably mounted and the threaded spindle 261 is mounted in such a way that it can only execute rotational movements. This axial fixing is achieved by means of a preloaded spring 272 (cf. FIG. 5) pushing the threaded spindle against an axial rolling bearing 273.1, 273.2, which is itself supported at the casing of the brake cylinder 243. This axial force also prevents the toothed face from being released. The proximity switch 271 is closed because the indicator groove 262.5 is outside its detection zone.

Figure 9:
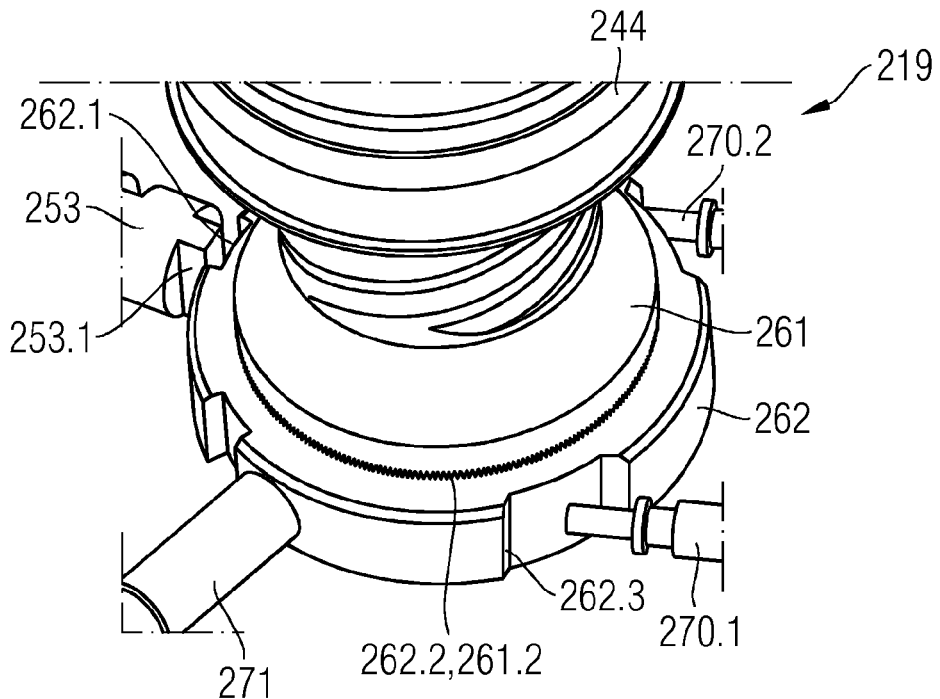

FIG. 9 shows the next intermediate state, in which the braking force has increased until blocked by the locking wheel 262. The brake piston 244 has therefore moved further as a result of a further increase in the braking pressure, until the locking wheel 262 comes to rest on the second stop 270.2. The force on the brake pads has increased linearly in accordance with the spring rate of the brake caliper arrangement.

Figure 10:
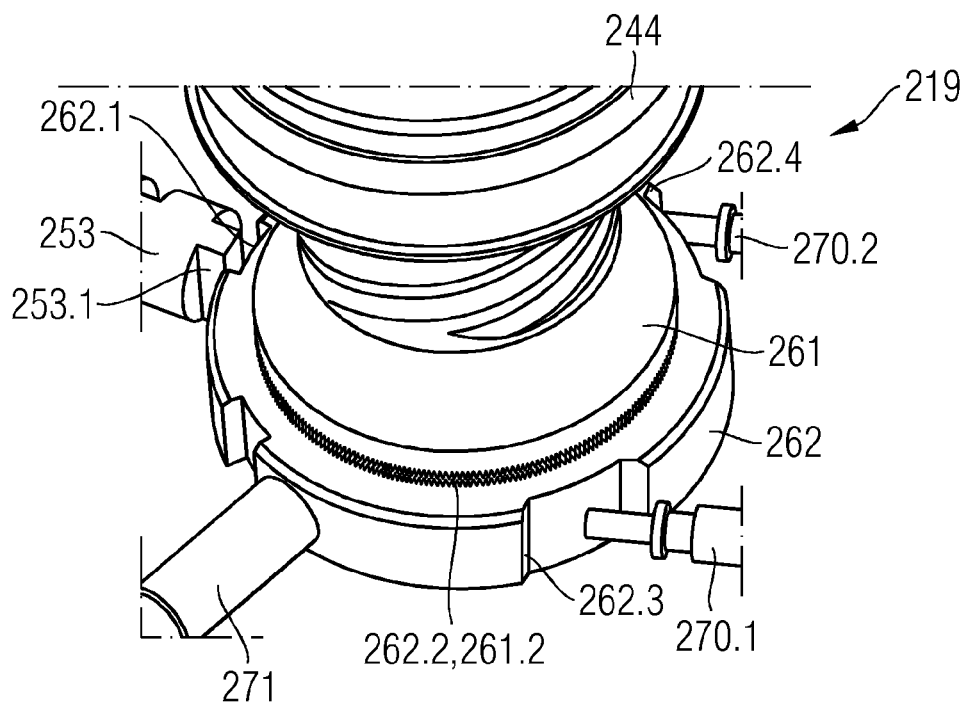

FIG. 10 shows the next intermediate state, in which the braking force $F_B$ has increased until the toothed face 261.2 has lifted from the toothed face 262.2. The brake cylinder pressure $Cp_B$ has been increased further, resulting in the brake piston 244 moving further out according to the brake caliper stiffness. However, the locking wheel 262 and the threaded spindle 261 have not been able to rotate any further. Consequently, the brake piston 244 pulls on the threaded spindle 261 such that the force of the preloaded spring 272 is overcome. The toothed face 261.2 begins to separate from the toothed face 262.2. A direct comparison of FIG. 9 with FIG. 10 reveals that the threaded spindle 261 has separated from the locking wheel 262, albeit only slightly (due to the large number of teeth in the toothed faces 261.2, 262.2). The separation process is a movement which results from the combination of an axial movement and a rotation of the threaded spindle.

Figure 11:
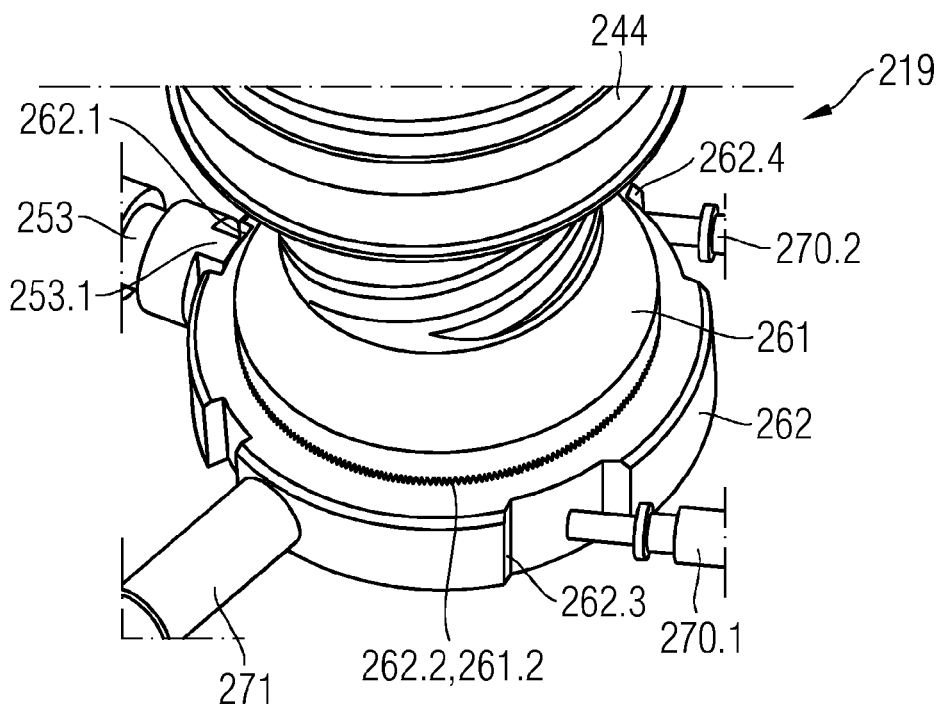

FIG. 11 shows the next intermediate state, in which the braking force $F_B$ has increased to the extent that the toothed face 261.2 has notched forward relative to the toothed face 262.2, and in which the arresting pawl 253.1 of the locking piston 253 has subsequently sunk into the locking groove 262.5 of the locking wheel 262. The brake cylinder pressure $Cp_B$ was therefore increased further. The threaded spindle 261 continued to experience the combination of axial lifting and rotation, until the tooth tips of the toothed faces 261.2, 262.2 were directly opposed. In the next instant, the toothed face 261.2 suddenly jumped into the next tooth gap of the toothed face 262.2 to find itself again engaged in the toothed face 262.2, i.e. it notched forward. The full engagement in the next tooth gap became geometrically possible because the locking wheel 262 was moved backwards slightly (lifted off from the second stop 270.2) as a result of the engagement process. This process of the notching forward of the toothed face only occurs if the brake piston 244 can move out far enough as a result of wear to brake pads and discs. If this worn state has not yet been reached, the toothed face 261.2 moves back into the original engagement with the toothed face 262.2 when the brake unit is released. The hydraulic retention of the locking piston 253 was then canceled, and it sank into the locking groove 262.1 of the locking wheel 262 by means of a spring force.

Figure 12:
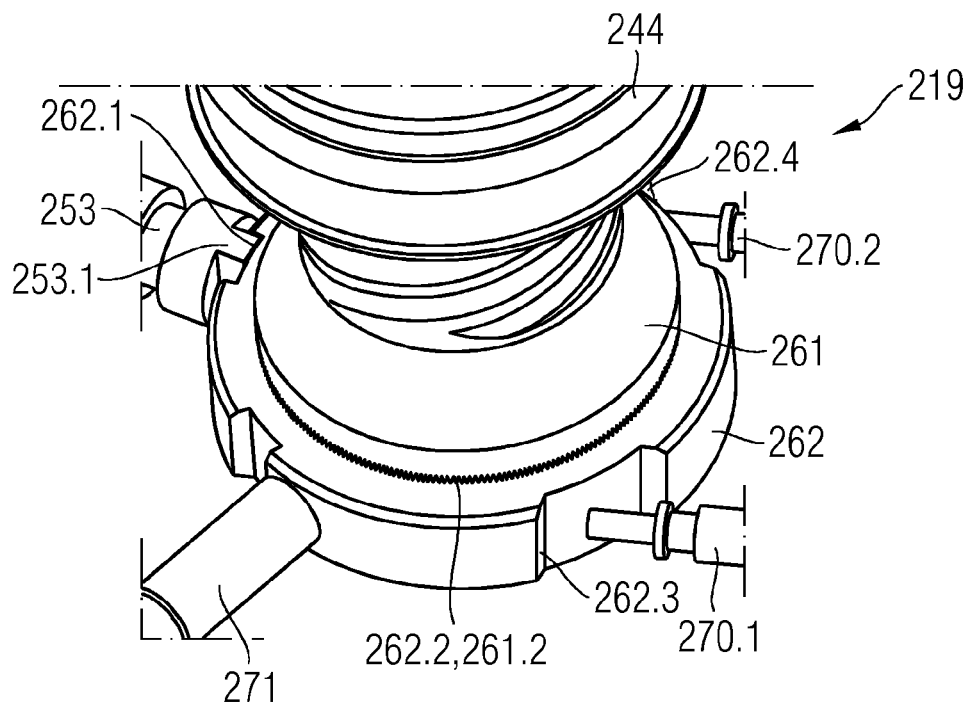

FIG. 12 shows the final state for the parking brake, in which the arresting means 158 (i.e. the mechanical arresting device for the parking brake) is active. The brake cylinder pressure $Cp_B$ has therefore been decreased, and the brake piston 244 moved back until its backward movement was blocked by the locking bolt 253.

The inventive brake unit offers the following advantages in particular:

The brake unit has no external hydraulic interfaces and therefore no hydraulic line, tube or hose connections to the vehicle. The only external interfaces from the brake unit to the vehicle or to the brake controller are those interfaces which are used for the voltage supply or the transfer of signals. Featuring a compact structural design, the integrated hydraulic circuit therefore allows actively regulated service braking, emergency braking or quick-action braking by providing the regulated braking force $F_B$, a hydraulically and/or mechanically actuated and arrestable parking brake function, and passive emergency braking by providing the passive emergency braking force $F_N$.

In particular, the adjustment and wear-related readjustment of the clearance L is realized in a structurally simple manner, and the moving parts are located in the hydraulic medium in this case, thereby reducing the danger of jamming and wear of said moving parts.

A released brake is reliably detected by means of a distance sensor 171 and/or the switch 271. Furthermore, a brake which is stuck can be detected by means of the sensor entity 31.

By virtue of the inventive brake units 9; 109; 209, a brake system 8 can be realized which is retardation-regulated and which also offers braking distance reliability during operation.

The inventive brake unit can easily be adapted in a project-specific manner by means of parameterizing characteristic braking values, and therefore a high degree of standardization can be achieved using this brake unit.

The invention claimed is:

1. A brake unit for a vehicle, the brake unit comprising:
a brake cylinder;
a brake piston axially guided in said brake cylinder and a locking element operatively connected to said brake piston;
a clearance adjustment device for adjusting a clearance, said device including two stops assigned to each other and disposed to come to rest against each other when the brake unit is opened;
one of said stops being formed on said locking element;
a locking member engaged with said locking element under a force of a preloaded spring, wherein said locking element is blocked by said locking member when said stops come to rest against each other; and
an actuation device configured to displace said locking member from being engaged with said locking element, against the force of said preloaded spring, into a position released from said locking element.

2. The brake unit according to claim 1, wherein said actuation device is a mechanical actuator.

3. The brake unit according to claim 1, wherein said locking element is a locking slide configured to overlap a carrier formed on said brake piston, and said locking member is a locking pawl configured to engage into a toothing formed on said locking slide under the force of the preloaded spring.

4. The brake unit according to claim 1, wherein said locking element is a locking wheel and said locking member is a threaded spindle, and said threaded spindle is coupled to said brake piston via a screw-thread drive and supported at said brake cylinder via a bearing.

5. The brake unit according to claim 4, wherein said threaded spindle is a non-self-locking threaded spindle concentrically screwed into said brake piston.

6. The brake unit according to claim 4, wherein:
said actuation device comprises a tie rod, a tie rod screw, and a pin to be axially displaced by rotating said tie rod screw via a guide in said tie rod;
said preloaded spring is supported at said tie rod; and
said threaded spindle comprises actuation surfaces projecting into a path of movement of said pin, said actuation surfaces being so formed that said threaded spindle is displaced into the position released from said locking element when said pin is displaced against the force of the preloaded spring.

7. The brake unit according to claim 1, wherein said locking element and said locking member are formed with conforming teeth for meshing in engagement.

8. The brake unit according to claim 1, which comprises an arresting pawl configured to block said locking element when the brake unit is in a closed position.

9. The brake unit according to claim 1, wherein:
said two stops of said clearance adjustment device are first stops and said clearance adjustment device further comprises two second stops assigned to each other and disposed to come to rest against each other when the brake unit is closed;
one of said second stops is formed on said locking element into which said locking member engages, under the force of the preloaded spring, so as to enable said locking element to continue to catch or slip relative to said locking member under a force of said brake piston when said second stops come to rest against each other.

10. The brake unit according to claim 1, wherein the vehicle is a rail vehicle and the brake unit is configured as a brake unit of the rail vehicle.

11. A vehicle, comprising:
a chassis and at least one wheel set mounted to said chassis;
the brake unit according to claim 1 disposed for frictional engagement with said at least one wheel set for braking the vehicle.

12. The vehicle according to claim 11, wherein the vehicle is a rail vehicle.

* * * * *